Nov. 5, 1929.  W. F. MOTTIER  1,734,441
GEAR SHIFTING MECHANISM
Filed Oct. 26, 1925  2 Sheets-Sheet 1
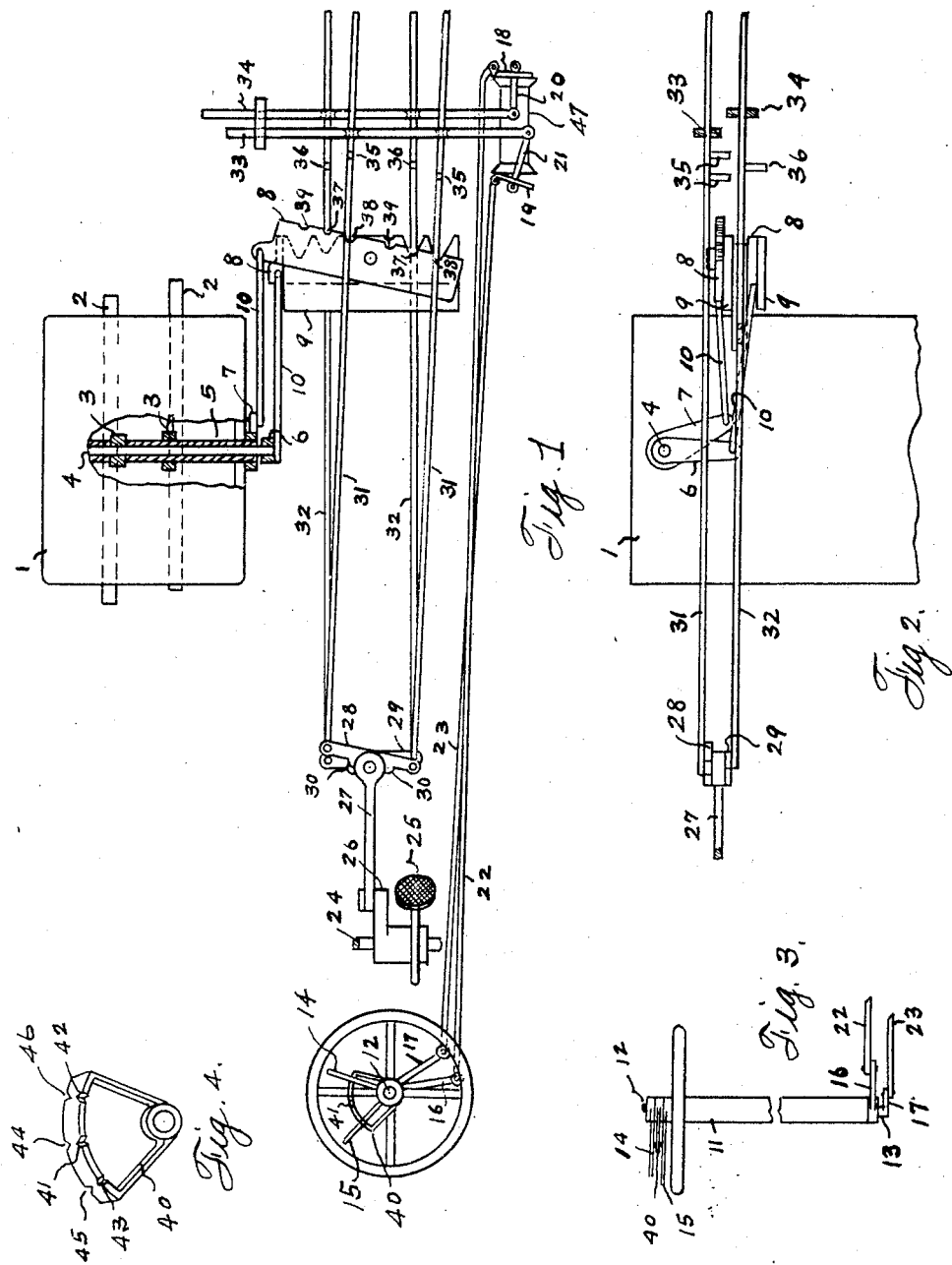
Inventor
Walter F. Mottier
By Hardway Cather
Attorneys

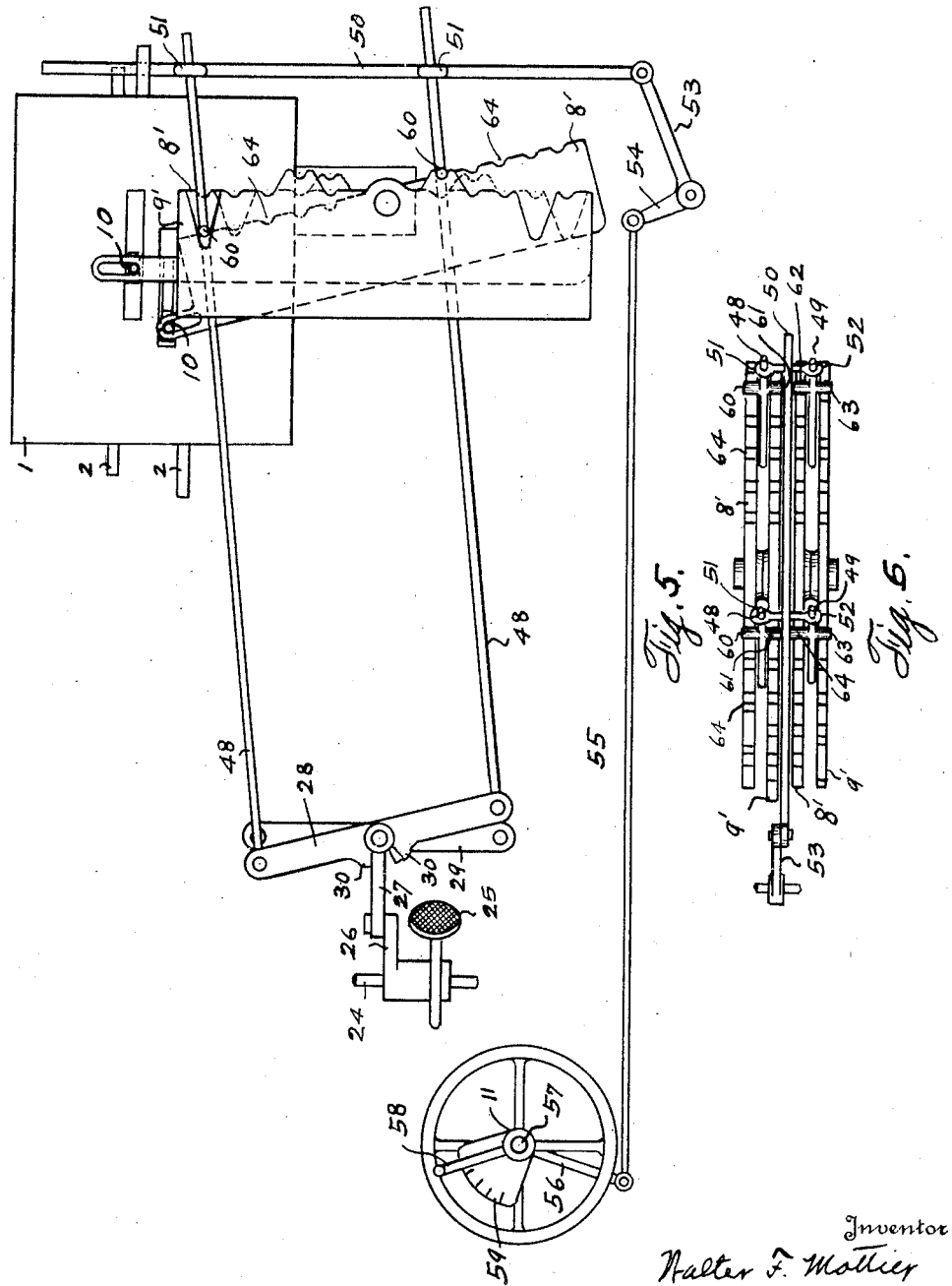

Patented Nov. 5, 1929

1,734,441

UNITED STATES PATENT OFFICE

WALTER F. MOTTIER, OF EL CAMPO, TEXAS

GEAR-SHIFTING MECHANISM

Application filed October 26, 1925. Serial No. 65,056.

This invention relates to new and useful improvements in a gear shifting mechanism.

One object of the invention is to produce a device of the character described, through which the gears of a transmission mechanism may be easily shifted and different gear ratios, and consequently different relative speeds, between the driving and driven members of the transmission, readily obtained.

Another object of the invention is to produce a mechanism of the character described by means of which the desired gear ratio may be selected, by the operator, and thereafter obtained by a simple manipulation of the clutch controlling pedal.

With the above and other objects in view this invention has particular relation to certain novel features of construction, operation and arrangement of parts, an example of which is given in this specification, and illustrated in the accompanying drawings, wherein:—

Figure 1 shows a plan view of the device, diagramatically illustrated, and showing the transmission partly in section.

Figure 2 shows a fragmentary side elevation thereof, partly in section.

Figure 3 shows a side elevation of the steering column of a motor vehicle and associated parts.

Figure 4 shows an enlarged perspective view of a segmental rack employed.

Figure 5 shows a plan view of a modified form of the device, and

Figure 6 shows a fragmentary rear view thereof.

Referring now more particularly to the drawings wherein like numerals of reference designate similar parts in each of the figures, the numeral 1 designates the transmission case, of conventional form and slidably mounted in which are the gear shifting rods 2, 2.

The transmission in the case 1 is of the ordinary type. This invention has to do with the shifting mechanism only, and is not concerned with the particular type of transmission employed.

The rods 2, 2, are shifted by means of the shift arms 3, 3, which are operatively connected therewith, one of which is fixed on the shaft 4 and the other of which is fixed on the shaft 5 which telescopes over said shaft 4. These shafts are suitably mounted to rotate in the case 1 and fixed on their outer ends are the respective arms 6 and 7.

There is a pair of pivotally mounted racks 8, 8 arranged one above the other and having a common axis around which they pivot, and lying adjacent these respective racks are the corresponding fixed stop plates 9, 9. The arms 6, 7, are connected to the corresponding ends of the shift racks 8, 8, through the respective links 10, 10.

The numeral 11 designates the steering column of a motor vehicle which may be equipped with this mechanism. Associated with this steering column are the control rods 12 and 13 whose upper ends have the manual levers 14 and 15, respectively, fixed thereto and the lower ends of these control rods have the respective arms 16, and 17 fixed thereto.

Arranged at a convenient place are two pivotally mounted T-members composed of the cross heads 18 and 19 and the corresponding legs 20 and 21 fixed rigidly to said cross heads, said T-members being reversely arranged, as shown and at their centers being pivotally connected to a fixed anchor, preferably the adjacent part of the framework.

The arms 16, 17, are connected to the corresponding ends of the respective cross heads 18 and 19, through the rods 22 and 23.

The numeral 24 designates the clutch actuating shaft on which there is mounted the clutch controlling pedal 25. The pedal 25 has a fixed arm 26 adjacent the pedal to the free end of which the forward end of the pull bar 27 is pivoted. Pivoted to the rear end of this pull bar there is a pair of equalizing bars, 28 and 29 having similar spaced stops 30, 30, on opposite side of the bar 27 and adapted to engage therewith to limit the range of movement of the equalizing bars 28 and 29. Two pairs of pull rods 31, 31 and 32, 32 are connected at their forward ends to the free ends of the respective equalizing bars 28 and 29 and these respective pairs of rods are supported on the respective upper and lower racks 8, 8. Transversely movable links 33 and 34 are pivoted, at one end, to the free ends of the corresponding legs 20 and 21 and these links have bearings to receive the rear ends of the corresponding pairs of pull rods 31, 31 and 32, 32. The pull rods 31 and 32 have depending studs 35, 35, and 36, 36, for a purpose to be hereinafter stated. The upper rack 8 has a pair of neutral notches 37, 37, a pair of intermediate speed notches 38, 38, and a pair of high speed notches 39, 39, and the other rack 8 has corresponding pairs of neutral low speed and reverse notches; the notches of each of said pairs being arranged on opposite sides of the axis on which the racks pivot. The stop plates 9, 9, also have notches, or seats, aligned with the notches of the respective rack members, and of suitable depth to permit the required range of movement of the pull rods 31 and 32.

Fixed at a convenient place on the steering column there is a segmental rack 40 with which the control levers 14, 15 are associated, one of said levers being above and the other beneath said rack 40 and this rack has a neutral notch or seat 41, and intermediate and high speed notches, or seats 42 and 43 for the control lever 14, and also has a neutral notch or seat 44, and low speed and reverse notches, or seats 45 and 46 for the control lever 15.

Slidably mounted on a suitable support, preferably the adjacent part of the vehicle frame work, and located between the cross heads 18 and 19 there is a plunger 47, preferably spool shaped in form. This plunger has a limited slidable movement between said cross heads, and when one of said cross heads is operated, out of neutral position, it operates through the plunger to actuate the other crosshead into neutral position. When a crosshead is in neutral position, as the term is here used, it is in such position that its connections with its corresponding pull rods 31, or 32, as the case may be, will hold said rods in position to actuate the corresponding rack 8, and the transmission gear connected thereto, into neutral position, if they are not already in such position.

When a gear ratio is desired, as for example for intermediate speed, the lever 14 may be moved into the notch 42 and this will operate, through the link 22, to swing the cross head 18 and its leg 20 around and through the rod 34 will shift the pull rods 32 so that their studs 36 will now align with the respective notches 38, provided for the desired gear ratio. The cross head 18, will at the same time, operate against the adjacent end of the plunger 47 and shift said plunger against the opposing cross head 19 and actuate the same into neutral position if it is not already in such position, and this will operate, through the connections described, to carry the studs 35, 35, of the pull rods 31, 31, into alignment with the neutral notches of the corresponding rack 8.

The pedal 25 may now be depressed and this will operate, first to disengage the clutch and then to carry said respective studs 35, 35, and 36, 36, into said aligned notches. The lower rack 8, if not already in neutral position, will be moved into said position and the upper rack will be actuated into the required position to give the selected gear ratio, the notches in the corresponding stop plate 9 being of sufficient depth to permit this required movement of the corresponding rack 8.

By corresponding movements of the lever 14 or 15 any gear ratio may, in a similar manner, be selected and the selected ratio established by the simple operation of said foot pedal.

In Figures 5 and 6 another, and a more simplified, form of the device is illustrated, embodying the same principle, as illustrated in the other figures. In this form the pivotally mounted racks 8', 8' are associated with the corresponding fixed stop plates 9', 9' and these racks may be connected, at corresponding ends, to the gear shifting rods 2, 2, either through the studs 10, 10, as shown, or directly to said rods. The pairs of pull rods 48, 48, and 49, 49, are pivotally connected at their forward ends to the respective equalizing bars 28, and 29, and these respective pairs of rods extend between the respective racks 8' and the corresponding stop plates 9'. There is a transversely movable link 50 provided with upper and lower bearings 51, 51, and 52, 52, through which the corresponding upper rods 48, 48, and lower rods 49, 49, work. There is a pivotally mounted bell crank to one arm 53, of which the link 50 is pivotally connected and to the other arm 54, the rear end of the rod 55 is pivoted. The forward end of this rod is pivoted to the free end of the arm 56 which is carried by the lower end of the control rod 57 which is associated with the steering column 11 and whose upper end carries the manual lever 58 which is associated with the segmental rack 59, mounted on the steering column and provided with notches for neutral, reverse and the various speeds ahead.

The rods 48 have the respective upstanding studs 60, 60 and the opposing depending studs 61, 61, and likewise the rods 49, 49 have the upstanding studs 62, 62 and the aligned depending studs 63, 63, all of said studs being located between the bearings of the link 50, and the corresponding racks and stop plates 8' and 9'.

The rear edge of each rack 8' has the pairs of seats, as 64, the seats of each pair being located on opposite sides of the pivotal mounting of the racks. The stop plates 9' also have the pairs of notches, of variable depths, one notch of each pair forming a stop for the corresponding stud and the other notch being of sufficient depth to permit the free movement of the aligned stud to the end of the forward movement of the pedal 25. The rods 48 and 49 may be shifted to neutral position, or to any desired gear position by moving the manual lever 58 to the selected gear position on the segmental rack 59. A depression of the foot pedal 25 will now accomplish the desired result. If neutral position is selected and the pedal depressed the studs 60, 61, will effect the required relative movements of the racks 8' to accomplish the desired shifting of the transmission gears.

If a gear position be desired the manual lever 58 is shifted to the desired position and the pedal 25 be operated and the rods 48, 49, will thereby be actuated to carry the studs 60, 62, into engagement with the racks 8', 8'. One of said racks, if not then in neutral position will be moved to neutral position in alignment with its stop plate and there stopped by the engagement of the corresponding studs 61, 61, or 63, 63, as the case may be, with the corresponding stop plate 9' but the other rack 9' will be swung on its pivot out of alignment with its stop plate to effect the desired gear movement, thus by reason of the fact that the notches in its stop plate 9' are of such relative depth as to permit this relative swinging movement. In this connection it is to be noted that the notches of the stop plates are so disposed that when neutral position is selected both racks, 8', 8' if not already in neutral position, will be moved to neutral, but if a gear position be selected one of said rack members will be stopped at neutral position and the other will be swung on its pivot to the selected gear position.

What I claim is:—

1. A gear shifting device comprising gearing for establishing a plurality of driving relations, gear shifting means in operative connection with the gears to be shifted, actuating members in operative connection with said gear shifting means, stop plates associated with said respective members and effective to limit their range of movement, manually operable means for operating said actuating members into different positions to establish any of said relations, selective means, under the control of the operator, and operatively connected with said manually operable means and through which the desired gear relation may be pre-selected.

2. A gear shifting device comprising gearing for establishing a plurality of driving relations, gear shifting means in operative connection with the gears to be shifted, actuating members in operative connection with said gear shifting means, manually operable means for operating said actuating members into different positions to establish any of said relations, a fixed member associated with each actuating member and formed to vary the influence of said manually operable means on its corresponding actuating member as the relative positions of said manually operable means and actuating member are varied, selective means, under the control of the operator, and operatively connected with said manually operable means and through which the desired gear relation may be pre-selected said manually operable means including a lever through which the same may be operated.

3. A gear shifting device adapted to shift gearing for establishing a plurality of driving relations and comprising a plurality of gear shifting means in operative connection with the gears to be shifted, actuating means in operative connection with said gear shifting means, selective means under the control of the operator, manually operable means adapted to be shifted by said selective means into different operative relations with said actuating means and through which said actuating means may be operated to establish the selected driving relation, and fixed abutments associated with said manually operable means and effective to provide a different limit to the range of movement of said manually operable means for each of said operative relations.

4. A gear shifting device adapted to shift the gears of a transmission to establish a plurality of driving relations, and including gear shifting means; actuating means in operative connection with said shifting means and embodying a plurality of pivotally mounted members; selective means under the control of the operator; manually operable means adapted to be shifted, by said selective means, into different operative relations with the respective pivotally mounted members and through which said actuating means may be operated to establish selected driving relations, and fixed abutments providing different limits of movement of said manually operable means for said respective operative relations.

5. A gear shifting device, adapted to shift the gears of a transmission to establish a plurality of driving relations, and including gear shifting means; actuating means connected directly to said shifting means and embodying a plurality of pivotally mounted rack members; selective means under the control of the operator; manually operable means adapted to be shifted, by said selective means, into different operative relations with the respective pivotally mounted members and through which said actuating means may be operated to establish a selected driving relation and a stop associated with each pivotally mounted member and adapted to engage said manually operable means to limit the range of movement thereof, and of said pivotally mounted members.

6. In a gear shifting device a plurality of gear actuating means, a manually operable device associated with said actuating means and adapted to relatively shift said means simultaneously, and selective means under the control of the operator and effective to establish different operative relations between said actuating means and said manually operable device, said selective means including a plurality of manually shiftable members in operative connection with said manually operable device, and an operative connection between said members through which the manual shifting of one member automatically shifts the other.

In testimony whereof I have signed my name to this specification.

WALTER F. MOTTIER.